Sept. 2, 1958  J. B. WHEATLEY  2,850,227
COMPRESSOR AIR BLEED-OFF VALVE
Filed Dec. 3, 1954

Inventor
John B. Wheatley
By Paul Fitzpatrick
Attorney ered Sept. 2, 1958

2,850,227
COMPRESSOR AIR BLEED-OFF VALVE

John B. Wheatley, Indianapolis, Ind., assignor to General Motors Corporation, Detroit, Mich., a corporation of Delaware Application December 3, 1954, Serial No. 472,928

1 Claim. (Cl. 230—114)

This invention relates to an axial flow compressor for an aircraft gas turbine engine or the like and more particularly to an air bleed-off valve for the compressor.

When a gas turbine engine utilizes an axial flow compressor with a large number of stages it is desirable to provide some means for bleeding off compressed air at one of the intermediate stages during starting and low speed operation. A gas turbine engine usually operates at a substantially uniform high speed and the compressor and turbine blading of the engine are accordingly designed for high speed operation. A multi-stage axial flow air compressor tends to load up during starting and low speed operation of the engine as the blading is not designed for these operating conditions. Better performance may be had during starting and low speed operation by releasing a portion of the compressed air from an intermediate stage directly to atmosphere.

An object of the invention is to provide a suitable air bleed-off valving arrangement for a high speed multi-stage axial flow air compressor.

Further objects and advantages of the present invention will be apparent from the following description, reference being had to the accompanying drawing, wherein a preferred form of the present invention is clearly shown.

Figure 1:
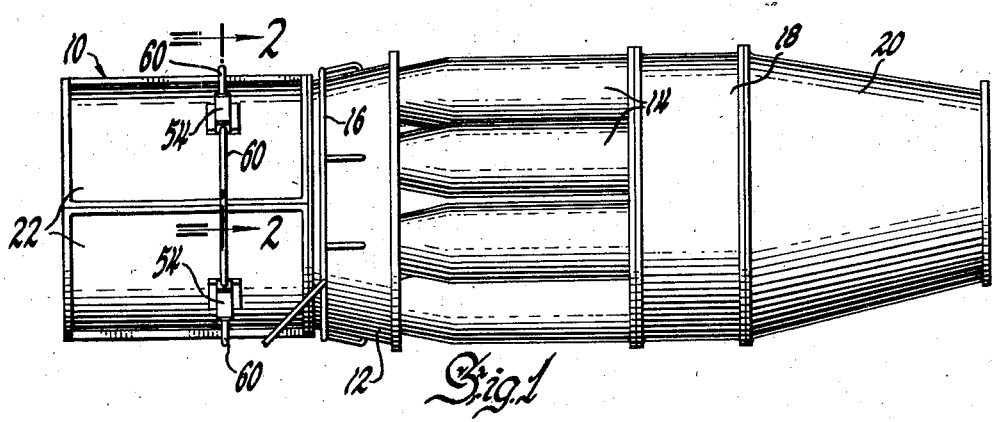
Figure 1 is a side elevation of an aircraft gas turbine engine incorporating the invention.
Figure 2:
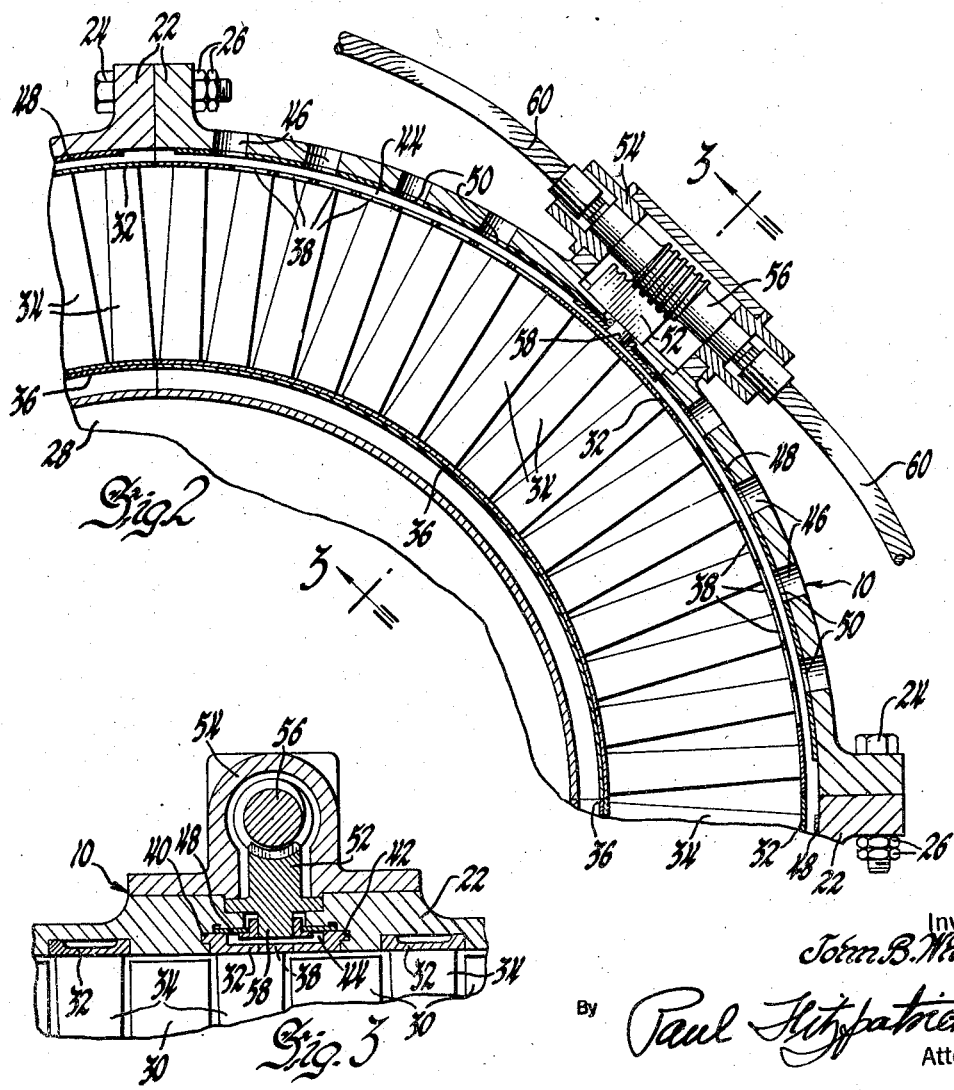
Figure 2 is an enlarged partial section through an intermediate stage of the compressor portion of the engine taken substantially on the plane indicated by the line 2—2 of Figure 1.
Figure 3:
Figure 3 is a partial section taken substantially on the plane indicated by the line 3—3 of Figure 2.

Referring now to the drawing and more particularly to Figure 1, the gas turbine engine is of a known type and includes a multi-stage axial flow air compressor 10 that discharges through a diffuser 12 into a plurality of cannular combustion chambers 14 which are supplied with fuel by a fuel manifold 16. An axial flow turbine 18 is drivingly connected to the compressor 10 and receives the products of combustion from the combustion chambers 14 and discharges to atmosphere through an exhaust nozzle 20.

As previously noted, it is desirable that compressed air from an intermediate stage be bled off to atmosphere during starting and low speed operation of the engine. Referring to the remaining figures, the compressor 10 includes a cylindrical outer casing that is formed by a plurality, preferably four, of arcuate sections 22 that are suitably retained in assembled relation, as by longitudinal rows of bolts 24 and nuts 26. A rotor 28 is housed in the casing and carries a plurality of axially spaced, annular rows of blades 30. A plurality of stator vane assemblies are supported on the cylindrical inner surface of the compressor casing in alternating relation with the rows of rotor blades.

Each of the stator vane assemblies includes a plurality, preferably four, of arcuate outer shroud strips 32 each carrying an arcuate row of stator vanes 34 and an arcuate inner shroud strip 36. An assembled stator vane assembly therefor comprises inner and outer shroud rings joined by an annular row of radial vanes. An intermediate one of the stator vane assemblies is provided with an annular row of radial passages 38 that extend through each of the outer shroud strips 32 between the vanes 34. The inner surface of the casing is recessed to receive the edges of each of the intermediate shroud strips 32 through peripheral tongue and groove connections 40 and 42 and also to define a peripheral chamber 44 with the outer surfaces of the intermediate shroud strips that communicates with the compressor interior through the intemediate shroud strip passages 38. An annular row of radial valve passages 46 extends through the arcuate casing sections 22 to place the chamber 44 in communication with the exterior of the casing.

A small amount of radial clearance is provided in the chamber 44 between the casing sections 22 and the intermediate shroud strips 32 to slidably support for circumferential movement a plurality of thin flexible arcuate slide valves 48. Each slide valve 48 has an arcuate row of radial valve ports 50 which are registerable with the casing valve passages 46 to bleed off pressurized air from the intermediate compression stage of the compressor during starting and low speed operation.

Each of the slide valves 48 is provided with an actuating means for shifting the same circumferentially in the casing to open and close the valve passages 46. Each actuating means includes a rack 52 slidably mounted in a housing 54 secured on the respective casing section 22 and a pinion 56 rotatably mounted in the housing in engagement with the rack. Radial pin portions 58 project from the racks 52 and engage the respective slide valves 48 to shift the same circumferentially on rotation of the pinions 56. A plurality of flexible drive cables 60 extend around the compressor casing and interconnect the pinions 56 for simultaneous operation, and any one of the flexible cables may be suitably driven to accomplish joint valve actuation.

The valving arrangement of the invention provides high quantity air bleed-off when open due to the large number of valve ports and reduces air leakage to an absolute minimum when closed as the valve strips are tightly seated against the cylindrical internal surface of the compressor casing by the internal air pressure of the compressor. The slide valves, the stator vane assemblies and the casing are parted radially into similar arcuate sections to simplify their assembly with the compressor rotor. The simplicity and compactness of the valving arrangement affords improved advantages for aircraft engine design where air space, strength and weight considerations are at a premium.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

A multi-stage axial flow compressor comprising a plurality of assmbled arcuate sections forming a casing with a cylindrical inner surface, a rotor housed in the casing and carrying a plurality of axially spaced annular rows of blades, a plurality of stator vane assemblies supported on the inner surface of the casing in alternating relation with the rows of rotor blades, each vane assembly including a plurality of arcuate outer shroud strips each carrying an arcuate row of vanes, an intermediate one of the stator vane shroud strips having an arcuate row of radial passages extending therethrough between the vanes, the inner surface of the casing being recessed to receive the edges of the intermediate shroud strip through a tongue and groove connection and to define a chamber with the outer surface of the shroud strip that communicates with the compressor interior through the shroud strip passages, the casing having an arcuate row of radial valve passages extending therethrough to place the chamber in communication with the exterior of the casing, a thin flexible arcuate slide valve slidably supported in the chamber by engagement between the recessed inner surface of the casing and the outer surface of the intermediate shroud strip, the slide valve having an arcuate row of radial valve ports registerable with the valve passages in the casing for bleeding off pressurized air from the compressor interior, and means for shifting the slide valve circumferentially of the casing comprising a rack slidably mounted on the casing and secured to the slide valve and a pinion rotationally mounted on the casing in engagement with the rack.

References Cited in the file of this patent

UNITED STATES PATENTS

| | | |
|---|---|---|
| 2,300,766 | Baumann | Nov. 3, 1942 |
| 2,424,839 | Morton | July 29, 1947 |
| 2,698,711 | Newcomb | Jan. 4, 1955 |
| 2,702,665 | Ledwith | Feb. 22, 1955 |
| 2,741,423 | Lombard | Apr. 10, 1956 |

FOREIGN PATENTS

| | | |
|---|---|---|
| 237,490 | Germany | Aug. 22, 1911 |
| 672,193 | Great Britain | May 14, 1952 |
| 1,012,339 | France | Apr. 16, 1952 |
| 1,058,900 | France | Nov. 10, 1953 |